United States Patent [19]
Butterfield et al.

[11] 3,800,174
[45] Mar. 26, 1974

[54] LIQUID TRANSFER ASSEMBLY FOR A LIQUID COOLED DYNAMOELECTRIC MACHINE
[75] Inventors: John L. Butterfield; Glen E. Gathers, both of Erie, Pa.
[73] Assignee: General Electric Company, Wilmington, Mass.
[22] Filed: Apr. 9, 1973
[21] Appl. No.: 349,059

[52] U.S. Cl. .............................................. 310/61
[51] Int. Cl. .............................................. H02k 1/32
[58] Field of Search ............ 310/52, 54, 61, 64, 58, 310/53, 68 D, 59, 65, 60

[56] References Cited
UNITED STATES PATENTS

| | | | |
|---|---|---|---|
| 3,497,736 | 2/1970 | Cuny | 310/54 |
| 3,267,868 | 8/1966 | Page | 310/54 |
| 2,897,383 | 7/1959 | Barrows | 310/68 D |
| 3,543,062 | 11/1970 | Banchieri | 310/54 |
| 3,060,335 | 10/1962 | Greenwald | 310/61 |

Primary Examiner—R. Skudy

[57] ABSTRACT

The invention here described relates to an assembly for transferring a cooling liquid such as oil, for example, into and out of the rotating elements of a dynamoelectric machine. The assembly includes a pair of concentric oil transfer tubes mounted between a stationary housing and a rotating hollow shaft. One of the tubes communicates with the interior of the hollow shaft to furnish cooling oil from a pump or any other suitable source of oil to the interior of the rotating shaft. A second concentric tube communicates with an oil return hole in the shaft wall to distribute the circulating oil to the remainder of the housing. A pair of abrasion resistant, non-metallic sleeves are mounted between the individual oil feed tubes and the wall of the rotating shaft to provide an oil seal between the stationary tubes and the rotating shaft. The non-abrading, non-metallic sleeves may be fabricated of a plastic impregnated roving and are dimensioned to leave a minute, but definite clearance between the wall and the sleeve. The combination of the viscous oil and the sleeve produce a good oil seal, while at the same time, producing a very effective, abrasion resistant running fit. By virtue of the slight clearance between the sleeves and the tube, it is also possible to accomodate small variations in tolerance and alignment, resulting in important manufacturing and assembly improvements.

5 Claims, 2 Drawing Figures

PATENTED MAR 26 1974   3,800,174

LIQUID TRANSFER ASSEMBLY FOR A LIQUID COOLED DYNAMOELECTRIC MACHINE

The instant invention relates to a liquid cooled dynamoelectric machine, and more particularly, to an arrangement for simply and effectively transferring a cooling liquid between the stationary and rotating portions of the machine.

In the past, various types of liquid cooled dynamoelectric machines [such as high speed aircraft generators, synchronous motors which utilize DC excitation of the rotor through the use of brushless exciters etc.] included hollow shafts through which a cooling liquid such as oil is circulated. The oil is brought out of the shaft and passes through the machine rotor and is then pumped into the housing for cooling the stator and other elements.

In such liquid cooled machines it will be obvious that the transfer of the cooling oil into and out of the hollow rotating shaft can present some difficult problems since the transfer device must be coupled between a stationary element and the rotating shaft. In certain dynamoelectric machines, as for example, those used in aircraft where the rotational speeds may be quite high, i.e., from 7 to 25,000 rpm, the design of the assembly for transferring the cooling oil into and out of the rotating shaft can be very troublesome. Obviously, very close rubbing or running fits between the rotating shaft and the transfer mechanism are required. This, in turn, requires expensive and time consuming machining operations to maintain the very close tolerance and high degree of smoothness which is necessary to achieve a good running fit between the stationary and the rotating members. An associated set of problems, of course, is to avoid leakage at the points where the stationary and running member interface, and to minimize wear and abrasion. In some instances, elaborate and costly expedients such as silver plating of the mating elements are resorted in order to obtain proper operation. That is, by silver plating the stationary element a steel-silver interface is provided which has a lower coefficient of sliding friction (i.e., coeff of friction steel-silver ≅ 0.1 − 0.2) than does a steel on steel interface. However, while this expedient reduces the coefficient of sliding friction, silver is such a relatively soft material that it is difficult to achieve the proper wear resistance. As a result, the silver plating wears off and difficulties in operation of the device are not uncommon. Furthermore, leakage of oil at the point of metal-to-metal contact continue to be a problem with such oil transfer assemblies and leakage rates in the order of 200–300 cc/min for machines operation at rotational speeds in excess of 20,000 rpm is not unusual. Consequently, a need exists for an oil transfer assembly which will permit the efficient transfer of cooling oil into and out of a hollow rotating shaft, while at the same time, minimizing leakage and reducing wear and abrasion of the components making up the transfer assembly.

It is therefore a primary objective of this invention to provide an assembly for transferring cooling liquid in a dynamoelectric machine in which leakage and wear is minimized.

Another objective of the invention is to provide a cooling liquid transfer arrangement for a dynamoelectric machine which is simple in construction and effective in transferring the liquid with a minimum of leakage.

Still another objective of the invention is to provide an oil transfer arrangement for a dynamoelectric machine which is simple in construction, effective in operation and easy to assemble.

Other advantages and objectives of the invention will become apparent as a description thereof proceeds.

Broadly speaking, the arrangement for transferring a cooling liquid into and out of a hollow shaft contemplates the use of a pair of stationary, concentric tubes with one end of the tubes attached to the housing and the other end of the tubes projecting into an opening in the rotating hollow shaft. The central passage of the inner tube communicates directly with the hollow shaft and the annular space between the two tubes defines an oil return passage, in which the recirculated oil flows outwardly into the machine housing for spray cooling the stator windings. A pair of non-metallic, abrasion resistant sleeves are loosely fitted between the tubes and the opening in the rotating shaft. These sleeves are so dimensioned that a very small clearance is permitted between the shaft and the sleeves whereby the sleeves float between the outside diameter of each of the tubes and the inside diameter of the shaft opening leaving a very small clearance. When a viscous material such as the cooling oil tries to pass through the annular space, the close clearance and the viscosity of the oil combine to create a seal. A good abrasion resistant oil seal is thus provided. At the same time, the use of a metal-to-metal rubbing fit between the oil delivery tubes and the rotating shaft is avoided which minimizes the destructive effects usually accompanying such metal-to-metal running fits.

The novel features, which are believed to be characteristic of this invention, are set forth with particularity in the appended claims. The invention itself, however, both as to its organization and mode of operation, together with further objects and advantages, may best be understood by reference to the following description taken in connection with the accompanying drawings in which:

Figure 1:
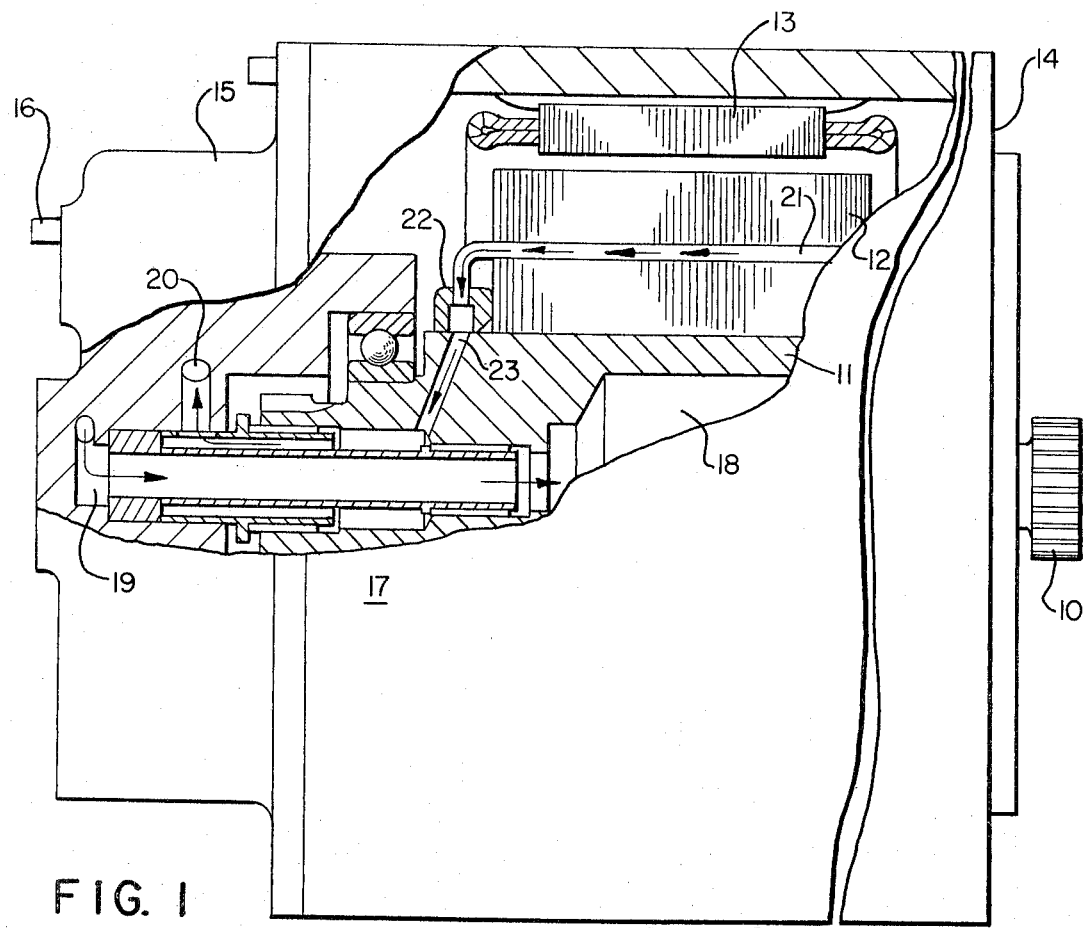
FIG. 1 is a partially broken away elevational view of the dynamoelectric assembly.

In the drawing of FIG. 1, the invention is shown and will be described in connection with an aircraft generator to be driven by an aircraft engine through the geared end 10 of a generator shaft 11. It will be appreciated however, that the invention is not limited to high speed generators but is equally applicable to any liquid cooled dynamoelectric machine using a hollow shaft. Shaft 11 is of a hollow construction and supports a laminated generator rotor core 12 which reacts electrodynamically with a stator core 13 and its associated windings to generate an output voltage. An end bell 15 is fastened to housing 14 in which the generator is mounted by means of suitable bolts 16 and includes one or more pumps, not shown, which are driven from shaft 11. The pumps force cooling oil under pressure through an oil transfer arrangement shown generally at 17 to the interior cavity 18 of shaft 11.

Oil transfer arrangement 17 consists of a pair of concentric oil delivery tubes with the inner tube communicating at one end with an oil inlet passage 19 through which the oil is pumped and at the other end with shaft cavity 18. An annular oil return passage between the inner and outer oil inlet tubes provides a return path for the oil and communicates with passage 20 in housing 15 to distribute the oil for spray cooling of the stator windings. The incoming cooling oil passes through the inner tube into cavity 18 and down the rotating shaft. The oil passes out of the shaft and into a manifold, not shown, at the right hand end of the shaft and is recirculated through suitable oil carrying cooling pipes 21 in rotor 12 to a second manifold 22 which also surrounds the rotor shaft. A plurality of radially distributed oil return passages 23 in shaft 11 allow oil from manifold 22 to flow through the annular passage between the concentric tubes into passage 20 and thence into the housing for cooling the stator.

The concentric oil delivery tubes are fixedly mounted in end bell 15 and extend into openings in the rotating shaft. A pair of sleeves, presently to be described, float between the outside tubes and the inside of the shaft openings with a very small annular clearance. The viscous oil in trying to pass through these annular spaces between the sleeves and the shaft opening combine to create seal and thereby reduces leakage of oil, while at the same time, preventing direct contact between the metallic oil transfer tubes and the rotating shaft member.

Figure 2:
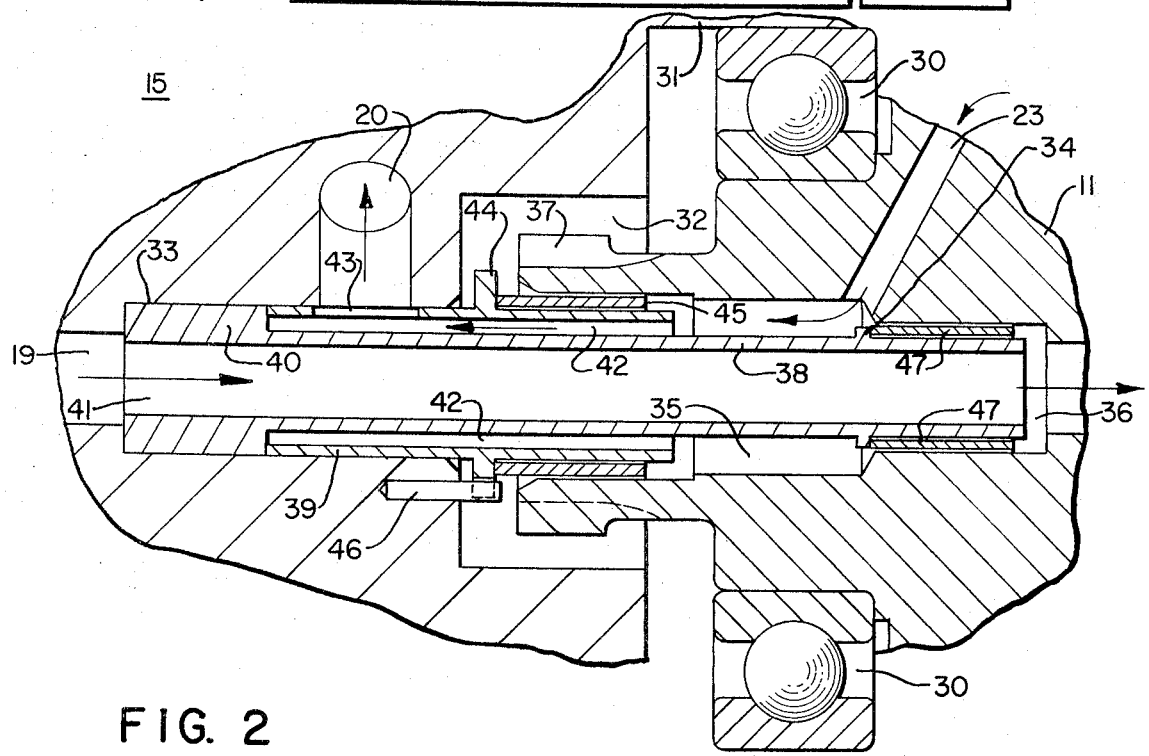
FIG. 2 is a detailed showing of the cooling oil transfer arrangement of FIG. 1.

FIG. 2 is a detailed showing of the oil transfer arrangement of FIG. 1, which includes the two concentric delivery tubes. Hollow shaft 11 is supported for rotation in roller bearings 30 the outer races of which are secured to a hub 31 forming part of the stationary end bell 15. The hub 31 has an opening 32 to receive the end of the rotor shaft and an opening 33 for receiving the oil delivery tubes, presently to be described. Opening 33 communicates with the oil inlet passage 19 and oil outlet passage 20. Shaft 11 has corresponding openings 35 and 36 at one end to receive the oil inlet tubes. Shaft 11 is splined at one end, as illustrated at 37, with the splines engaging a gear, not shown, for driving the oil pumps located in the stationary end bell 15. The gear for driving the oil pumps has its axis parallel to the axis of the oil shaft and is rotated 90° into the paper and is, therefore, not visible in FIG. 2.

The oil transfer arrangement, as pointed out generally earlier, comprises a pair of concentric tubes 38 and 39 one of which connects oil inlet passage 19 to cavity 18 of the rotor shaft and the other of which conncect oil return passages 23 in the shaft to oil outlet passage 20. Inner tube 38 has a shoulder 40 at one end which is firmly anchored by press fitting or the like in hub opening 33 and extends at its other end into opening 36 in shaft 11. The tube has a central passage 41 which connects oil inlet passage 19 to the interior cavty 18 of rotating shaft 11. A flange 34 is provided at the right hand end of the tube and acts as a retaining member for sealing sleeves presently to be described.

One end of outer tube 39 which surrounds tube 38 also extends into opening 33 in hub 31 and rests against shoulder 40 of inlet tube 38. The other end of tube 39 extends into opening 35 of shaft 11. Since tube 39 is concentric with tube 38, there is an annular passage 42 between the tubes. Oil return tube 39 has an opening 43 in the upper wall which communicates with passage 20 in hub 31 so that the oil flowing through the annular passage passes through opening 20 and flows into the stator housing for spray cooling the stator windings. A flange 44 extends radially from tube 38 and is positioned between the back wall of opening 32 and the end of shaft 11. Flange 44 limits the lateral movement of tube 39 and also provides a stop for sleeve 45 which acts as the oil seal for the return path. A locking pin 46 extends through an opening in flange 44 and is fixed to hub 31 to prevent rotation of the outer tube. The return path for the oil is therefore from oil return passages 23 into opening 35 of shaft 11 and thence through annular passage 42 between the outer and inner oil delivery tubes and into the stator.

A pair of non-metallic, abrasion resistant sleeves 45 and 47 are positioned respectively between tubes 38 and 39 and the interior wall of the rotating shaft. Sleeve 45 surrounds tube 39 at its right hand end and provides the interface with the rotating element as well as acting as part of the oil seal. Sleeve 47 is positioned at and surrounds the right hand of tube 38 and rides between the tube and the wall of shaft opening 36. Shoulder 42 on tube 38 retains sleeve 47 in place to provide an oil seal between the shaft cavity and the remainder of the oil transfer assembly.

In the oil transfer arrangement of the invention, the sleeves which are positioned between the concentric tubes and the interior wall of shaft 11 perform a plurality of functions. These sleeves in cooperation with the oil act as a seal to limit escape of the oil and to maintain its flow in the desired channel. The sleeves also provide the running fit between the rotating shaft and the stationary oil distribution assembly. In addition to these two functions, the sleeves also make it possible to accommodate some misalignment between the stationary tubes and the rotating shaft. That is, since the sleeves are loosely mounted, they will naturally accommodate some misalignment, but more importantly, if there is misalignment, the oil transfer tubes may be reformed slightly to suit the shaft and only the sleeves replaced to accommodate the new tube dimensions.

The sleeves are non-metallic, are abrasion resistant and fit loosely between the tubes and the shaft. Preferably, the sleeve is tubing made of a woven cloth base impregnated with a thermosetting phenolic resin. The outer surface of the tubing is ground or buffed to produce a smooth surface. That is, the base material is a relatively coarse woven cotton cloth that is impregnated with a suitable thermosettting phenolic resin and then cured to produce a rigid tube which has high abrasion resistance thereby minimizing wear between the surface of the sleeve and the shaft.

while the preferred embodiment of the non-metallic sleeve is a phenolic impregnated roving, other materials may also be utilized. Nylon, polytetraflourethylene [sold by the E.I. duPont de Nemours Co. of Wilmington, Dela. under their trade designation Teflon] or sintered polyimide powder [sold by E.I. duPont de Nemours Co. under their trade designation Vespel] may also be utilized to fabricate the sleeve. By interposing the non-metallic, abrasion resistant sleeve between the metal tube and the inner wall of the shaft, many of the problems normally associated with a metal-to-metal rubbing fit are minimized and consequently, the fabrication of the oil transfer tube is substantially simplified. For one thing, the coefficient of sliding friction is reduced. The coefficient for a steel on plastic interface is 0.05 – 0.1 compared to 0.1 – 0.2 for silver on steel. Thus, the frictional effects are halved. One important consequence is that the surfaces of the metallic tubes need no longer be polished or ground to a very fine finish nor is it necessary to maintain the close dimensional tolerances customary in metal-to-metal running fits.

The sleeve floats between the outside diameter of the tube and the inside diameter of the shaft with a very small annular clerance, i.e., in the order of 0.001 inches. When a viscous material such as the cooling oil tries to pass through this annular passage, the clearance and the viscosity of the oil combined to create a seal thereby minimizing leakage of the oil past the seal and into the shaft housing. In fact, it has been found that for a generator operating at speeds of up to 25,000 rpm at 200°F and utilizing an ASTM Standard No. 23669 oil, which has a viscosity of 5.5 centistokes at 200°F, as the cooling liquid, the leakage rate did not exceed 100 cc's/min. This, of course, is a better than two to one improvement over a silver-steel metal-to-metal rubbing fit.

It may thus be seen that the assembly of concentric tubes and non-metallic abrasion resistant sleeves results in an arrangement which simplifies the construction of the oil transfer device, while at the same time, insuring that an adequate seal is provided to reduce leakage and insure proper flow.

As has been pointed out above, the running contact between the rotating shaft and the stationary oil transfer assembly takes place at the interface between the outer diameter of the non-metallic sleeves 45 and 47 and the inner surfaces of the openings or holes in the rotating shaft. By floating action of the sleeves, the normal close tolerances on the dimensions of these two elements are not required. However, it is desirable to control the smoothness of the holes in the rotating shaft by providing a finely prepared inner surface at the places where there is a running fit between the sleeves and the shaft. By finely prepared holes, a smooth 16 microinch finish, as this term is defined in the ANSI (American National Standards Institute) definitions is preferred since there is a rubbing fit between the sleeve and the inner surface of the holes in the shaft. However, even though a finely finished surface is preferred on a portion of the shaft holes, it will be apparent that this results in a substantial improvement over the prior art metal-to-metal rubbing surfaces, since the surface of the stationary oil inlet tubes need not be prepared to the grade of smoothness and fineness which would be required if a running fit between two metallic surfaces is maintained. Thus, not only is there relief in the degree of smoothness to which the outer surface of the stationary oil delivery tube must be prepared, but obviously, the dimensional tolerances of the outer diameter of the stationary tube is not as critical as it was in the prior art since the loosely floating sleeve will absorb minor tolerance variations. The arrangement described herein thus provides important advantages in terms of lesser cost, lesser manufacturing complexity, and lesser complexity in assembly than do the prior art arrangements, while at the same time, providing equally efficient transfer of the cooling oil and equally adequate if not better sealing characteristics between the stationary oil tubes and the rotating shaft.

Consequently, it is apparent that an oil transfer arrangement for a dynamoelectric machine has been provided which is simple in construction, easy to manufacture and install and highly effective in operation.

While a particular embodiment of the invention has been illustrated and described, it will be apparent that various modifications thereof may obviously be made in various instrumentalities and arrangements described without departing from the true spirit and scope of the invention as defined in the appended claims.

What is claimed as new and desired to be secured by Letters Patent of the United States is:

1. In an oil transfer arrangement for transferring a cooling liquid into and out of the hollow shaft of a dynamoelectric machine, the combination of:
   a. A hollow shaft supporting the rotating component of a dynamoelectric machine,
   b. A transfer assembly for bringing a liquid into and out of a hollow shaft comprising a pair of concentric tube means one end of each of said tubes extending into said rotating hollow shaft,
   c. The space between said concentric tubes defining an annular passage for the transmission of liquid out of the shaft, and the inner one of the tube means providing for transmission of liquid into said shaft,
   d. A pair of abrasion resistant, non-metallic sleeves, each positioned between the outer wall of one of said concentric tubes and the said hollow shaft to establish a running fit between the shaft and the transfer assembly, said sleeves cooperating with the cooling liquid to form a seal to limit escape of the liquid past the said sleeeves.

2. The oil transfer assembly for a dynamoelectric machine according to claim 1 wherein said abrasion resistant non-metallic sleeves are plastic.

3. The oil transfer assembly for dynamoelectric machines according to claim 1 wherein said abrasion resistant non-metallic sleeves consist of a plastic impregnated roving.

4. The oil transfer assembly for a dynamoelectric machine accoridng to claim 1 wherein said sleeves are fashioned of a roving impregnated with a thermosetting phenolic resin.

5. The oil transfer assembly for a dynamoelectric machine accoridng to claim 1, wherein the sleeves float loosely between the outer diameter of the tube and the inner wall of said rotating shaft, whereby said sleeves compensate for any eccentricities or distortions in the tubes.

* * * * *